US012189225B2

(12) United States Patent
Bae et al.

(10) Patent No.: US 12,189,225 B2
(45) Date of Patent: Jan. 7, 2025

(54) DISPLAY DEVICE

(71) Applicant: Samsung Display Co., Ltd., Yongin-Si (KR)

(72) Inventors: Sung-hwan Bae, Yongin-si (KR); Seungki Song, Goyang-si (KR); Chansol Yoo, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 253 days.

(21) Appl. No.: 17/543,559

(22) Filed: Dec. 6, 2021

(65) Prior Publication Data

US 2022/0091454 A1 Mar. 24, 2022

Related U.S. Application Data

(63) Continuation of application No. 15/711,268, filed on Sep. 21, 2017, now Pat. No. 11,194,187.

(30) Foreign Application Priority Data

Oct. 6, 2016 (KR) ........................ 10-2016-0129296

(51) Int. Cl.
*G02F 1/1333* (2006.01)
*G09G 3/36* (2006.01)

(52) U.S. Cl.
CPC ....... *G02F 1/13336* (2013.01); *G09G 3/3648* (2013.01); *G02F 1/133388* (2021.01);
(Continued)

(58) Field of Classification Search
CPC ... G09G 2310/0232; G09G 2300/0413; G09G 3/36–3696; G09G 2300/0421; G09G 2300/0426; G09G 2300/026
See application file for complete search history.

(56) References Cited

U.S. PATENT DOCUMENTS 7,656,372 B2 * 2/2010 Sato ..................... G09G 3/3648
345/87
7,894,007 B2 * 2/2011 Fukami ................ G02F 1/1395
345/96
(Continued)

FOREIGN PATENT DOCUMENTS

JP 2014115361 A 6/2014
JP 5917694 B2 4/2016
(Continued)

*Primary Examiner* — Patrick F Marinelli
(74) *Attorney, Agent, or Firm* — CANTOR COLBURN LLP

(57) ABSTRACT

A display device includes a first display substrate, a second display substrate, display units, a dummy display unit, and a sealing element. The first display substrate includes a first base substrate including display, peripheral and intermediate areas, and a pixel circuit overlapping with the display area. The second display substrate includes a second base substrate spaced apart from the first base substrate. The display units overlap with the display area, between the first and second base substrates. Each of the display units includes a liquid crystal layer, a common electrode, and a pixel electrode connected to the pixel circuit. The dummy display unit overlaps with the intermediate area, between the first and second base substrates, and includes first and second dummy electrodes.

15 Claims, 14 Drawing Sheets

(52) U.S. Cl.
CPC .............. *G09G 2300/026* (2013.01); *G09G 2300/0413* (2013.01); *G09G 2310/0232* (2013.01)

(56) References Cited

U.S. PATENT DOCUMENTS

| | | | | |
|---|---|---|---|---|
| 8,643,814 B2* | 2/2014 | Yokota | ............. | G02F 1/133345 349/149 |
| 8,786,810 B2* | 7/2014 | Mochiku | .......... | G02F 1/134336 349/5 |
| 8,817,219 B2* | 8/2014 | Hara | .................. | G02F 1/13452 349/5 |
| 8,817,220 B2* | 8/2014 | Yokota | ................ | G09G 3/3648 349/149 |
| 9,142,180 B2* | 9/2015 | Yang | .................... | G09G 3/3688 |
| 9,245,468 B2* | 1/2016 | Lee | ....................... | G09G 3/006 |
| 9,360,728 B2 | 6/2016 | Kang et al. | | |
| 9,653,033 B2* | 5/2017 | Kobayashi | .......... | G09G 3/3648 |
| 9,711,098 B2* | 7/2017 | Park | ..................... | G09G 3/3611 |
| 10,026,370 B2* | 7/2018 | Yamada | ............... | G09G 3/3614 |
| 10,330,967 B2* | 6/2019 | Tamaki | ............. | G02F 1/133528 |
| 11,551,644 B1* | 1/2023 | Sanchez | .................. | G09G 3/03 |
| 2003/0201960 A1* | 10/2003 | Fujieda | ................ | G09G 3/3648 345/87 |
| 2004/0207772 A1* | 10/2004 | Tomita | .................. | G09G 3/006 349/42 |
| 2005/0184980 A1* | 8/2005 | Sato | ..................... | G09G 3/3648 345/204 |
| 2005/0280620 A1* | 12/2005 | Iida | ..................... | G09G 3/3655 345/90 |
| 2007/0070264 A1* | 3/2007 | Fujita | ................. | G02F 1/13318 349/61 |
| 2007/0126676 A1* | 6/2007 | Kim | ................. | G02F 1/133514 345/88 |
| 2007/0146518 A1* | 6/2007 | Hong | .................. | G09G 3/3614 348/308 |
| 2008/0062341 A1* | 3/2008 | Tanaka | ................ | G09G 3/3655 349/38 |
| 2008/0136990 A1* | 6/2008 | Kimura | .................... | G09G 3/20 349/114 |
| 2008/0170168 A1* | 7/2008 | Jung | ................ | G02F 1/136209 349/47 |
| 2008/0278644 A1* | 11/2008 | Fukami | ................. | G02F 1/1395 349/126 |
| 2009/0085859 A1* | 4/2009 | Song | .................... | G09G 3/3406 349/61 |
| 2011/0037785 A1* | 2/2011 | Shiomi | ............... | G09G 3/3426 345/102 |
| 2012/0033150 A1* | 2/2012 | Kim | ..................... | G02F 1/1339 349/153 |
| 2012/0086878 A1* | 4/2012 | Mochiku | .......... | G02F 1/134336 349/5 |
| 2012/0127413 A1* | 5/2012 | Shin | ..................... | G06F 3/0445 349/139 |
| 2012/0249896 A1* | 10/2012 | Yokota | ............. | G02F 1/134336 349/149 |
| 2012/0249919 A1* | 10/2012 | Yokota | ................ | G09G 3/3648 349/123 |
| 2012/0249920 A1* | 10/2012 | Hara | ..................... | G09G 3/002 349/151 |
| 2013/0092937 A1* | 4/2013 | Lee | ......................... | G09G 3/006 257/E23.179 |
| 2013/0128192 A1* | 5/2013 | Ishikawa | ............... | G02F 1/1339 445/25 |
| 2013/0187962 A1* | 7/2013 | Vieri | ........................ | G09G 3/20 345/698 |
| 2013/0257915 A1* | 10/2013 | Yang | .................... | G09G 3/3688 345/690 |
| 2014/0160413 A1* | 6/2014 | Nishida | ............. | G02F 1/134309 349/123 |
| 2014/0183481 A1* | 7/2014 | Lee | ....................... | G09G 3/3283 257/40 |
| 2014/0307190 A1* | 10/2014 | Tomikawa | ........... | G09G 3/3648 349/33 |
| 2015/0062524 A1* | 3/2015 | Kim | ..................... | G02F 1/1339 156/275.3 |
| 2015/0198842 A1* | 7/2015 | Kwak | ............... | G02F 1/136209 257/43 |
| 2016/0005364 A1* | 1/2016 | Kobayashi | .......... | G09G 3/3648 345/206 |
| 2016/0011633 A1* | 1/2016 | Watanabe | ............. | G02F 1/1333 345/184 |
| 2016/0027412 A1* | 1/2016 | Igawa | ................. | G09G 3/3648 345/99 |
| 2016/0154262 A1 | 6/2016 | Cho et al. | | |
| 2016/0155395 A1* | 6/2016 | Park | ....................... | G09G 3/3648 345/100 |
| 2016/0209685 A1* | 7/2016 | Tomikawa | ........... | G02F 1/1333 |
| 2016/0253973 A1* | 9/2016 | Nishida | ................ | G09G 3/3655 345/209 |
| 2016/0284302 A1* | 9/2016 | Tomikawa | ........... | G02F 1/1337 |
| 2016/0315128 A1* | 10/2016 | Lee | ........................ | H10K 59/88 |
| 2016/0357042 A1* | 12/2016 | Yoon | ................. | G02F 1/134309 |
| 2017/0116936 A1 | 4/2017 | Nishida | | |
| 2017/0124966 A1* | 5/2017 | Yamada | ............. | G02F 1/134309 |
| 2017/0146834 A1* | 5/2017 | Tak | ..................... | G02F 1/1339 |
| 2017/0176796 A1* | 6/2017 | Tamaki | ............. | G02F 1/133528 |
| 2017/0323617 A1* | 11/2017 | Yang | ..................... | H04N 9/646 |
| 2017/0329183 A1* | 11/2017 | Tsuchida | ........... | G02F 1/133608 |
| 2018/0031893 A1* | 2/2018 | Tamaki | ............. | G02F 1/133504 |
| 2018/0040268 A1* | 2/2018 | Murai | ............... | G02F 1/133512 |
| 2018/0101073 A1* | 4/2018 | Bae | ...................... | G09G 3/3648 |
| 2018/0299719 A1* | 10/2018 | Fujikawa | ............ | G09G 3/3648 |
| 2019/0094590 A1* | 3/2019 | Aoki | ....................... | G09G 3/36 |
| 2019/0101673 A1* | 4/2019 | Yao | ........................ | G09G 3/006 |
| 2019/0157363 A1* | 5/2019 | Lee | ....................... | H10K 50/81 |
| 2019/0165055 A1* | 5/2019 | Choi | ................... | G09G 3/3233 |
| 2022/0091454 A1* | 3/2022 | Bae | ...................... | G09G 3/3648 |

FOREIGN PATENT DOCUMENTS

| | | |
|---|---|---|
| JP | 5978919 B2 | 8/2016 |
| KR | 1020140086714 A | 7/2014 |
| KR | 1020150058655 A | 5/2015 |

\* cited by examiner

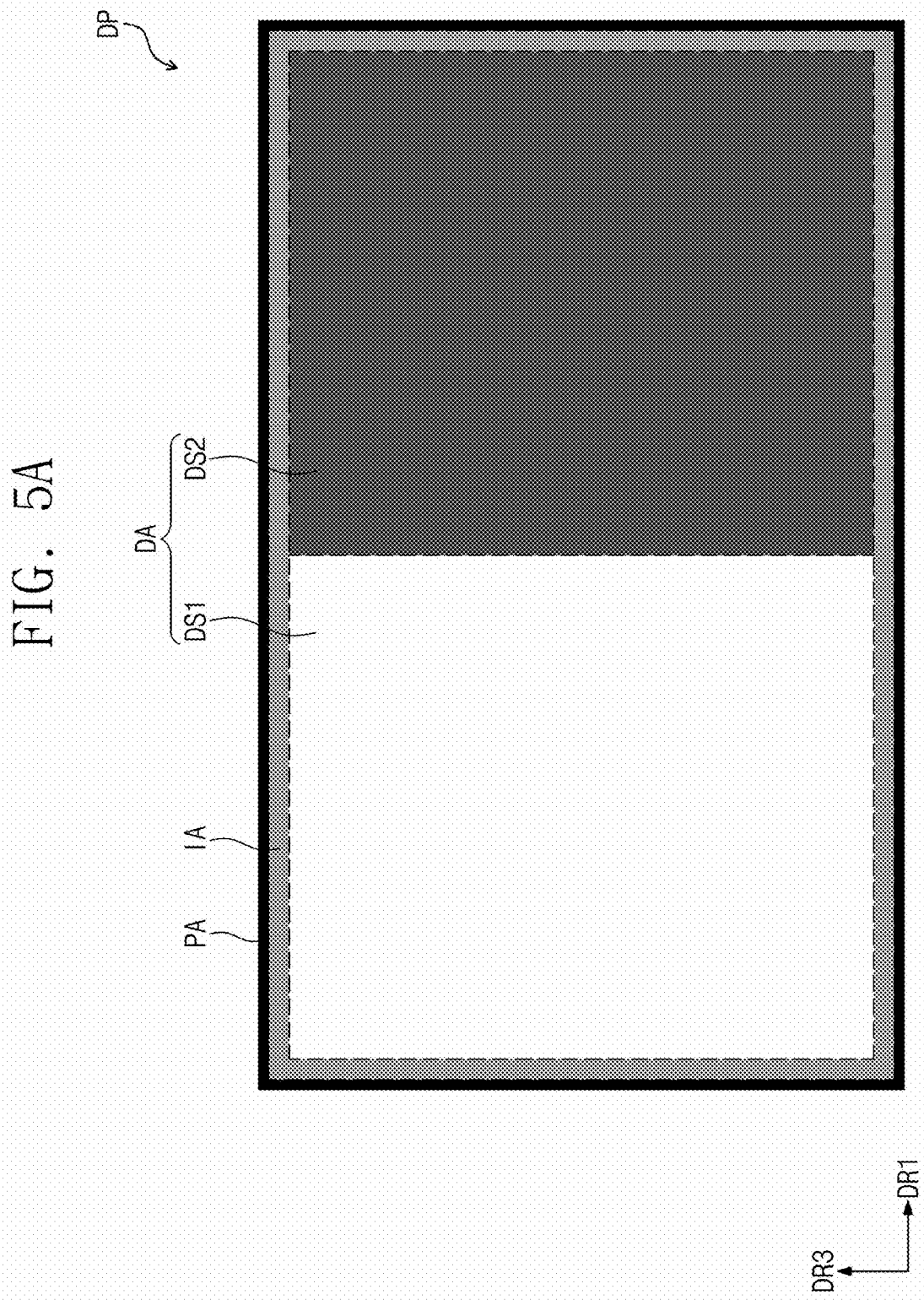

DISPLAY DEVICE

This application is a continuation of U.S. patent application Ser. No. 15/711,268, filed on Sep. 21, 2017, which claims priority to Korean Patent Application No. 10-2016-0129296, filed on Oct. 6, 2016, and all the benefits accruing therefrom under 35 U.S.C. § 119, the content of which in its entirety is herein incorporated by reference.

BACKGROUND

1. Field

The disclosure relates to a display device, and in particular, to a display device including a peripheral area, a display area, and an intermediate area therebetween.

2. Description of the Related Art

A display device typically includes a display panel including a plurality of gate lines, a plurality of data lines, and a plurality of pixels, which are connected to the gate and data lines. In addition, the display device further includes a gate driver circuit, which is configured to provide gate signals to the gate lines, and a data driver circuit, which is configured to provide data signals to the data lines.

The display panel includes a display area, which is used to display an image, and a peripheral area, in which the driver circuits are provided. In general, the display area is provided to be adjacent to the peripheral area that serves as a bezel of a display device. Some studies have been conducted recently to reduce an area of the bezel.

Especially, in the case where a single image is displayed through a plurality of display panels, the single image should be displayed in a divided manner, owing to the presence of the bezel of each display panel. That is, the bezel may cause discomfort to a user.

SUMMARY

Some embodiments of the invention provide a display device including an intermediate area between a peripheral area and a display area.

According to some embodiments of the invention, a display device may include a first display substrate, a second display substrate, display units, a dummy display unit, and a sealing element. In such embodiments, the first display substrate includes a first base substrate, on which a display area, a peripheral area, and an intermediate area therebetween are defined, and a pixel circuit disposed on the first based substrate and overlapping with the display area. In such embodiments, the second display substrate includes a second base substrate spaced apart from the first base substrate. In such embodiments, the display units are disposed between the first and second base substrates and may overlap with the display area. In such embodiments, each of the display units includes a liquid crystal layer, a common electrode, and a pixel electrode connected to the pixel circuit. In such embodiments, the dummy display unit is disposed between the first and second base substrates and may overlap with the intermediate area. In such embodiments, the dummy display unit includes first and second dummy electrodes which generate an electric field. In such embodiments, the sealing element may overlap with the peripheral area to seal a space between the first and second display substrates.

In some embodiments, the pixel electrode may be applied with one of a plurality of image voltages through the pixel circuit, and the first dummy electrode may be applied with an intermediate voltage generated based on the image voltages.

In some embodiments, the intermediate voltage may correspond to an average of the image voltages.

In some embodiments, the display units may include edge display units which are mostly adjacent to the intermediate area and overlap with an outermost region of the display area. In such embodiments, the intermediate voltage may correspond to an average of image voltages, which are respectively applied to the pixel electrodes of the edge display units.

In some embodiments, the first display substrate may further include a dummy line electrically connected to the first dummy electrode and is applied with the intermediate voltage.

In some embodiments, the pixel electrode may be disposed on the first base substrate, and the common electrode may be disposed on the second base substrate.

In some embodiments, the common electrode may extend to the intermediate area from the display area, and the common electrode and the second dummy electrode may be defined by a single unitary body.

In some embodiments, the display device may further include a black matrix disposed to expose the display area and the intermediate area and to cover the peripheral area.

In some embodiments, in a plan view, an inner sidewall of the sealing element may be aligned to an inner side wall of the black matrix when viewed from a plan view.

In some embodiments, the sealing element may have a black color.

In some embodiments, each of the pixel and common electrodes may be disposed on the first base substrate.

In some embodiments, the pixel electrode may receive a corresponding one of a plurality of image voltages through the pixel circuit, and an intermediate voltage may be applied to the first dummy electrode. In such embodiments, the intermediate voltage may be an average of the image voltages.

In some embodiments, the common electrode and the second dummy electrode may be applied with a same voltage as each other.

In some embodiments, the common electrode may extend to the intermediate area from the display area, and the common electrode and the second dummy electrode may be defined by a single unitary body.

In some embodiments, the first dummy electrode may include a plurality of first dummy electrodes, to which different intermediate voltages are applied, and a common voltage may be applied to the second dummy electrode and the common electrode.

In some embodiments, the first display substrate may further include a plurality of dummy lines which are respectively connected to the plurality of first dummy electrodes.

In some embodiments, one of the first and second display substrates may further include a color filter overlapping with the display area.

According to some embodiments of the invention, a display device may in which a display panel with a display area, a peripheral area, and an intermediate area therebetween are defined, where the display panel includes a plurality of pixels overlapping with the display area and a dummy display unit overlapping with the intermediate area, a signal control unit which outputs a plurality of image signals and an intermediate voltage, which is generated based on the image signals, and a data driver circuit which provides a plurality of image voltages, which corresponds to the image signals, and the intermediate voltage to the display panel. In such embodiments, the dummy display unit includes first and second dummy electrodes, which generate an electric field. In such embodiments, the first dummy electrode is applied with the intermediate voltage, and the second dummy electrode is applied with a common voltage.

In some embodiments, the signal control unit may include a gradation determination part, which generates the intermediate voltage based on an average of gradation levels of the image signals.

In some embodiments, the display panel may include a plurality of display panels, and each of the display panels may include a plurality of pixels overlapping with the display area and a dummy display unit overlapping with the intermediate area.

BRIEF DESCRIPTION OF THE DRAWINGS

Exemplary embodiments will be more clearly understood from the following brief description taken in conjunction with the accompanying drawings. The accompanying drawings represent non-limiting, exemplary embodiments as described herein.

FIG. 5A is a plan view illustrating a display panel on which an image is displayed according to some embodiments of the invention.

DETAILED DESCRIPTION

Figure 1:
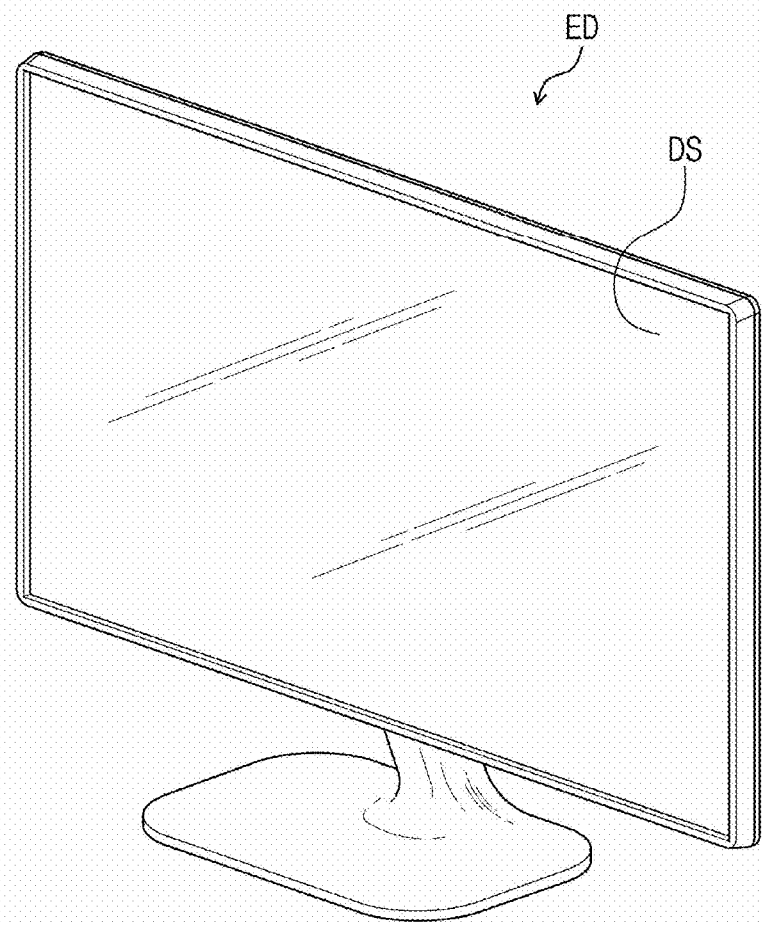
FIG. 1 is a perspective view of an electronic device according to some embodiments of the invention.

Exemplary embodiments of the invention will now be described more fully with reference to the accompanying drawings, in which exemplary embodiments are shown. Exemplary embodiments of the invention may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. In the drawings, the thicknesses of layers and regions are exaggerated for clarity. Like reference numerals in the drawings denote like elements, and thus their description may be omitted or simplified.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting thereof. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which exemplary embodiments of the invention belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 2:
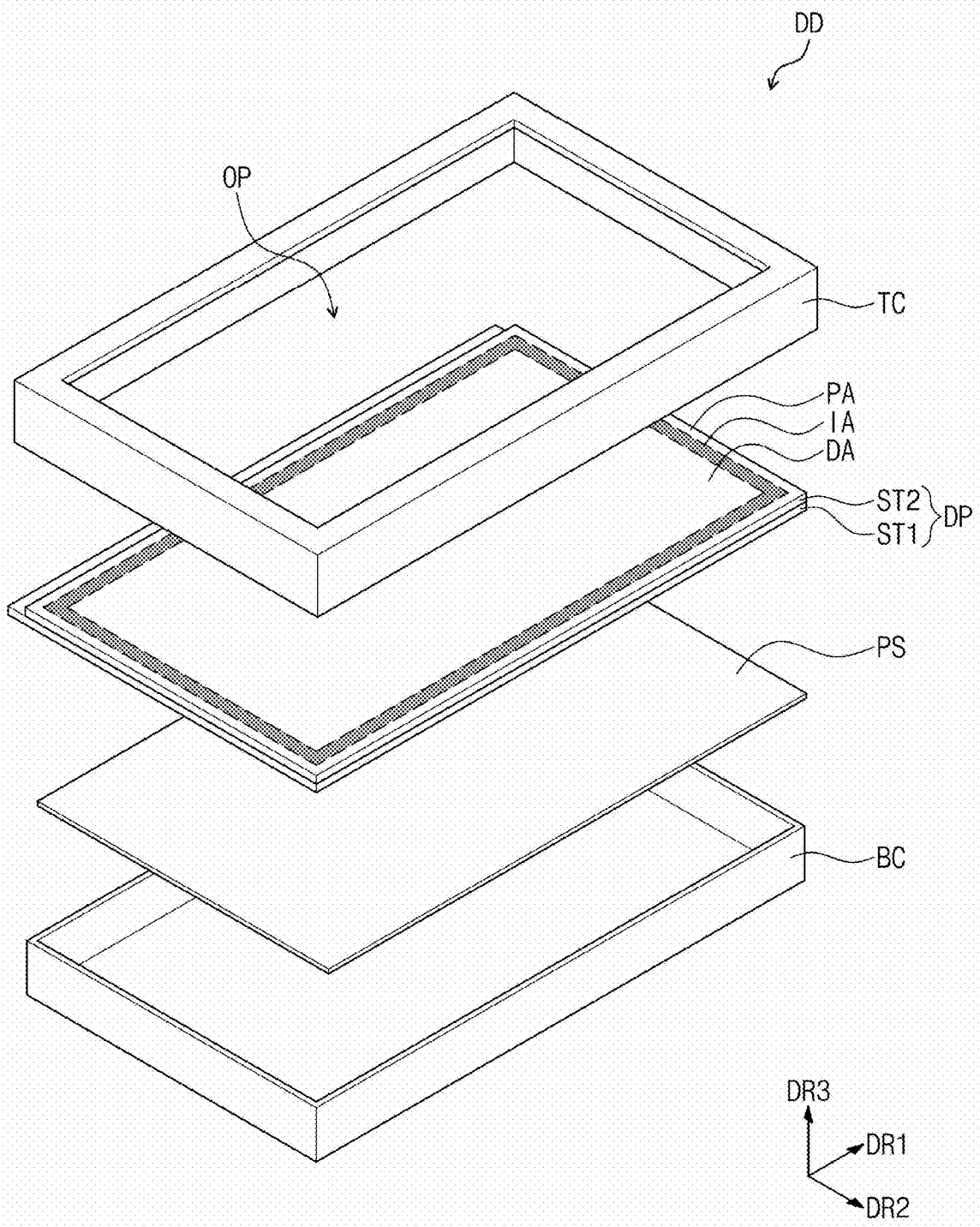
FIG. 2 is an exploded perspective view of a display device according to some embodiments of the invention.

FIG. 1 is a perspective view of a display device according to some embodiments of the invention. FIG. 2 is an exploded perspective view of a display device according to some embodiments of the invention.

In an embodiment, as shown in FIG. 1, an electronic device ED may be a monitor. Hereinafter, for convenience of description, embodiments where a display surface DS of the monitor is flat will be described in detail, but the invention is not limited thereto. In one embodiment, for example, a display surface of the electronic device ED may have a curved shape. The electronic device ED may be a medium- or large-sized electronic device (e.g., notebook computers and television sets) or a small-sized electronic device (e.g., mobile phones, tablets, game machines, and smart watches).

In an embodiment, the electronic device ED may include a display surface DS, which is defined by a first direction DR1 and a second direction DR2. A direction normal to the display surface DS (or a thickness direction of the electronic device ED) will be referred to as a third direction DR3. A front or top surface and a rear or bottom surface of each member may be distinguished, based on the third direction DR3. However, directions indicated by the first to third directions DR1, DR2, and DR3 may be relative concepts, and in certain embodiments, one direction may indicate another direction. Hereinafter, first to third directions may be directions indicated by the first to third directions DR1, DR2, and DR3, respectively, and will be referenced with the same numerals.

In an embodiment, the electronic device ED may include a window including the display surface DS, and a protection cover, which is coupled with the window. The protection cover may be configured to substantially cover the electronic device ED. The electronic device ED may further include a display device, an electronic module, and so forth, which are disposed inside the protection cover. The window may be coupled to the display device, which is disposed inside the protection cover. The window may include a glass substrate or a plastic substrate. The protection cover may include a plastic assembly, a metal assembly, or a plastic-metal assembly.

Referring to FIG. 2, in an embodiment, a display device DD may include a top chassis TC, a display panel DP, an optical sheet PS and a bottom chassis BC.

The top chassis TC may be disposed on the display panel DP and may be provided to have a rectangular frame, through which an opening OP is formed or defined, but the invention is not limited thereto. In one embodiment, for example, the top chassis TC may have a shape covering at least one of side surfaces of the display panel DP or may be omitted. In such an embodiment, as described above with reference to FIG. 1, the display device DD may further include a window, which is configured to allow an image to be displayed therethrough. In some embodiments, the window may be disposed on or in the top chassis TC.

The bottom chassis BC may be disposed below the display panel DP, and the display panel DP and the optical sheet PS may be disposed in the bottom chassis BC. The bottom chassis BC may be coupled to the top chassis TC.

The display panel DP may be disposed between the top chassis TC and the optical sheet PS. In some embodiments, the display panel DP may be an organic light emitting display panel, a liquid crystal display panel, a plasma display panel, an electrophoretic display panel, a microelectromechanical system display panel, an electrowetting display panel, or the like. Hereinafter, for convenience of description, embodiments where the display panel DP is a liquid crystal display panel will be described in detail, but the invention is not limited thereto.

In one embodiment, for example, the display panel DP may include a first display substrate ST1, a second display substrate ST2, and a liquid crystal layer (not shown) between the first and second display substrates ST1 and ST2. In such an embodiment, although not shown, a plurality of pixels, a plurality of driver lines, and a plurality of pixel electrodes may be disposed on the first display substrate ST1. In such an embodiment, the pixels may display an image and the driver lines may control operations of the pixels.

A color filter and a common electrode may be disposed on the second display substrate ST2, but the invention is not limited thereto. In one embodiment, for example, in certain embodiments, the color filter and the common electrode may be disposed on the first display substrate ST1. In such an embodiment, optical characteristics of the liquid crystal layer are controlled based on a difference in voltage level between the pixel electrode and the common electrode.

In an embodiment, where the display panel DP is not the liquid crystal display panel, the liquid crystal layer may be omitted, and components disposed on the first and second display substrates ST1 and ST2 may be changed. In one embodiment, for example, where the display panel DP is an organic electric field light-emitting display panel, the liquid crystal layer is omitted, and light-emitting units may be disposed on the first display substrate ST1.

In an embodiment, the display panel DP may include a display area DA, a peripheral area PA, and an intermediate area IA between the display and peripheral areas DA and PA. In such an embodiment, an image is output through the display area DA of the display panel DP toward a viewer or user, and the peripheral area PA may be configured (or block) to prevent the viewer or user from seeing the image. In such an embodiment, peripheral circuits (e.g., driver circuits) may be disposed on the peripheral area PA. The peripheral area PA may be defined as a bezel area. In some embodiments, the peripheral area PA may be disposed to surround the display area DA, but the invention is not limited thereto. In one alternative embodiment, for example, the peripheral area PA may be disposed adjacent to the display area DA.

In a conventional display device, the intermediate and peripheral areas of FIG. 2 may be defined as a bezel area that blocks light transmission for preventing an image from being recognized by an outer viewer. In such a conventional display device, a black matrix may be disposed on the first or second display substrate to overlap with the intermediate and peripheral areas. In a conventional display device, where the electronic device is configured to display a single image through a plurality of display panels, a user may recognize a single image as a plurality of divided images due to the bezel areas between the display panels. Accordingly, when a single image is displayed by a plurality display panels, the bezel areas of the display panels may lead to inconvenience to a viewer watching the image. The wider the bezel area, the more clearly the division of the image is recognized.

In embodiments of the invention, the display panel DP may be configured to display an image through the display area DA and to display an image with a specific gradation level through the intermediate area IA. An image to be displayed through the intermediate area IA may be generated based on a gradation level of an image to be displayed through the display area DA. In such an embodiment, unlike an image to be displayed through the display area DA, an image to be displayed through the intermediate area IA may have a single gradation level.

Thus, it may be not easy to recognize a border between the display area DA and the intermediate area IA according to embodiments of the invention, when compared with a border between a black bezel area and a display area of a conventional display device. In one embodiment, for example, in the display device DD according to some embodiments of the invention, the intermediate area IA may be configured to display an image with a specific gradation level, and thus, the bezel area may be recognized to have an illusively reduced area.

According to some embodiments of the invention, on the first display substrate ST1, the dummy electrode (e.g., of FIG. 5A) may be disposed to overlap with the intermediate area IA and may be used to display an image with a specific gradation through the intermediate area IA. In such an embodiment, optical characteristics of the liquid crystal layer are controlled based on a difference in voltage level between the dummy electrode and the common electrode.

According to some embodiments, as described above, the intermediate area IA of the display panel DP may be configured to display an image with a specific gradation, but the invention is not limited thereto. In one alternative embodiment, for example, a plurality of dummy electrodes may be disposed on the first display substrate ST1 to overlap with the intermediate area IA. In such an embodiment, since the plurality of dummy electrodes is provided, images, whose gradation levels are different from each other, may be displayed through the intermediate area IA. The dummy electrode(s) disposed on the intermediate area IA will be described in greater detail below.

The optical sheet PS may be disposed between the display panel DP and the bottom chassis BC. In one embodiment, for example, the optical sheet PS may include a diffusion sheet, which diffuses an incident light, and a prism sheet, which condenses the incident light.

In an embodiment, although not shown, the display device DD may further include a backlight unit that is configured to generate light. The light, which is incident to the display panel DP from the backlight unit, may be used to display an image through the display and intermediate areas DA and IA of the display panel DP.

Figure 3A:
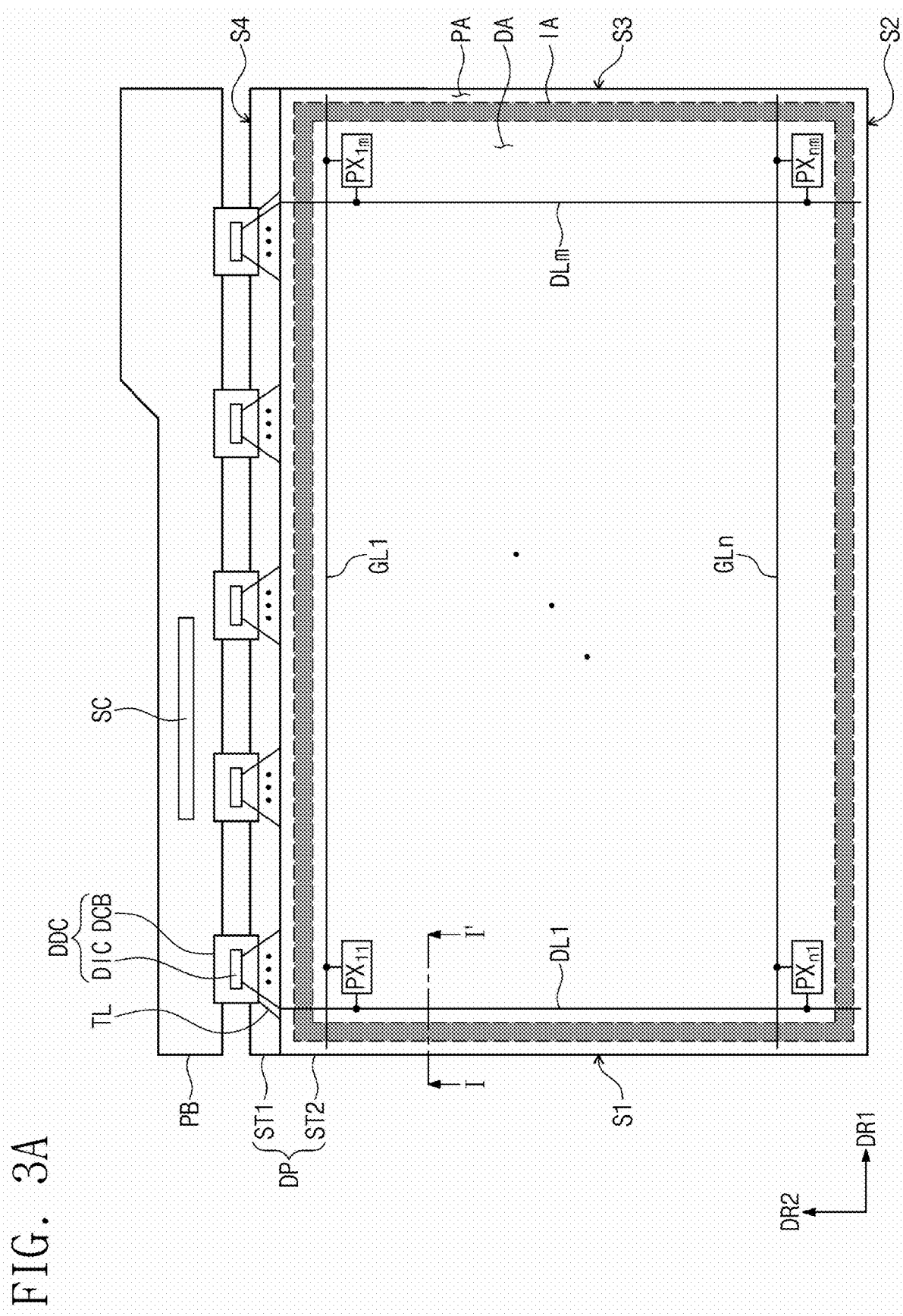
FIG. 3A is a plan view of a display device according to some embodiments of the invention.
Figure 3B:
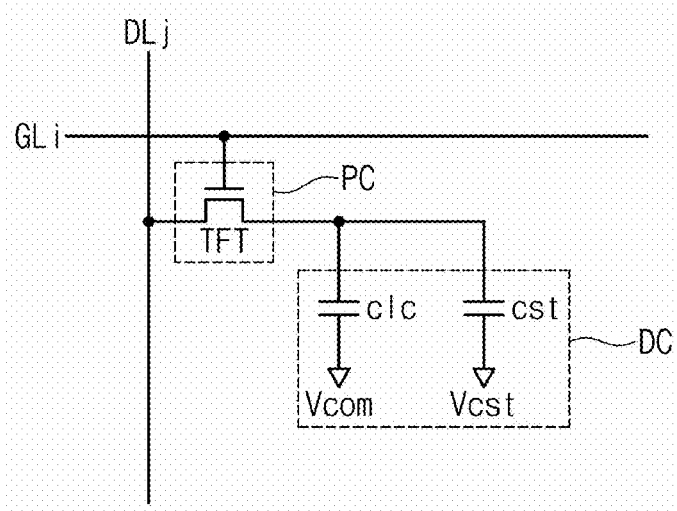
FIG. 3B is a circuit diagram of a pixel shown in FIG. 3A.

FIG. 3A is a plan view of a display device according to some embodiments of the invention. FIG. 3B is a circuit diagram of a pixel shown in FIG. 3A.

Referring to FIGS. 3A and 3B, in an embodiment of the display device, the first display substrate ST1 may include a plurality of gate lines GL1-GLn and a plurality of data lines DL1-DLm crossing the gate lines GL1-GLn. In such an embodiment, the first display substrate ST1 may include a plurality of pixels $PX_{11}$-$PX_{nm}$, which are connected to the gate lines GL1-GLn and the data lines DL1-DLm. The plurality of gate lines GL1-GLn may be connected to at least one gate driver circuit (not shown). The plurality of data lines DL1-DLm may be connected to at least one data driver circuit DDC.

Hereinafter, for convenience of description, an embodiment, in which a plurality of data driver circuits and a plurality of gate driver circuits are provided, will be described in detail, but the invention is not limited thereto. In one alternative embodiment, for example, each of the data driver circuit and the gate driver circuit may be in the form of a single driver unit. In such an embodiment, the display device DD may be used as a part of a small-sized electronic device (e.g., a mobile phone).

In some embodiments, a layer for the gate driver circuit may be simultaneously provided or formed on the pixels $PX_{11}$-$PX_{nm}$ and the first display substrate ST1, by using a thin-film process. In one embodiment, for example, the gate driver circuit may be mounted in the form of an amorphous silicon thin-film transistor gate driver circuit ("ASG") or an oxide semiconductor thin-film transistor gate driver circuit ("OSG"), on the peripheral area PA, but the invention is not limited thereto. In one embodiment, for example, the gate driver circuit may be in the form of a tape carrier package ("TCP").

In order to reduce complexity in the drawings, only some of the gate lines GL1-GLn and some of the data lines DL1-DLm are illustrated in FIG. 3A. Also, only some of the pixels $PX_{11}$-$PX_{nm}$ are illustrated in FIG. 3A. Each of the pixels $PX_{11}$-$PX_{nm}$ may be connected to a corresponding one of the gate lines GL1-GLn and a corresponding one of the data lines DL1-DLm.

The plurality of pixels PX11-PXnm may be classified into a plurality of groups, each of which is configured to display a specific color. Each of the pixels $PX_{11}$-PXnm may be configured to display one of primary colors. The primary colors may include red, green, blue, and white, but the invention is not limited thereto. In one embodiment, for example, the primary colors may further include various other colors such as yellow, cyan, and magenta.

In order to reduce complexity in the drawings, one of the pixels $PX_{11}$-$PX_{nm}$, which is connected to one (e.g., a j-th data line DLj) of the data lines DL1-DLm and one (e.g., an i-th gate line GLi) of the gate lines GL1-GLn, is illustrated in FIG. 3B, where i and j are natural numbers.

The pixel may include a pixel circuit PC and a display unit DC, which are electrically connected to each other. The pixel circuit PC may be or include a thin-film transistor TFT, which may include first to third electrodes. The first electrode of the thin-film transistor TFT may be connected to the i-th gate line GLi, and the second electrode may be connected to the j-th data line DLj. The third electrode of the thin-film transistor TFT may be connected to the display unit DC. In some embodiments, the first electrode may be a gate electrode, the second electrode may be a drain electrode, and the third electrode may be a source electrode, but the invention is not limited thereto. In one embodiment, for example, the second electrode may be a source electrode, and the third electrode may be a drain electrode.

When a gate signal is transmitted to the first electrode through the i-th gate line GLi, the thin-film transistor TFT may be turned on. When the thin-film transistor TFT is turned on, an image voltage applied to the j-th data line DLj may be applied to a third electrode through the second electrode.

The display unit DC may include a liquid crystal capacitor clc and a storage capacitor cst. The liquid crystal capacitor clc may include a pixel electrode and a common electrode. The pixel electrode may be connected to the third electrode of the thin-film transistor TFT. Thus, the image voltage applied to the third electrode of the thin-film transistor TFT may be applied to the pixel electrode. A common voltage Vcom may be applied to the common electrode. In one embodiment, for example, the common voltage Vcom may be a ground voltage, but the invention is not limited thereto.

The display unit DC may further include a liquid crystal layer, which is disposed between the pixel electrode and the common electrode. In such an embodiment, as described above, the liquid crystal layer may be controlled by a voltage difference between the image voltage and the common voltage Vcom, which are applied to the pixel electrode and the common electrode, respectively.

The storage capacitor cst may be connected in parallel to the liquid crystal capacitor clc. The storage capacitor cst may include a first storage electrode and a second storage electrode. The image voltage may be applied to the first storage electrode through the third electrode of the thin-film transistor TFT, and a storage voltage Vcst may be applied to the second storage electrode. In some embodiments, as described above, the storage capacitor cst may be connected to the liquid crystal capacitor clc, but in alternative embodiments, the storage capacitor cst may be omitted.

Referring back to FIG. 3A, a signal control unit SC may be disposed or mounted on a main circuit board PB. The signal control unit SC may receive an image signal and a control signal from an external graphic control unit (not shown). The control signal may include a vertical synchronization signal as a frame distinction signal, a horizontal synchronization signal as a row distinction signal, a data enable signal to indicate a data input period (e.g., data enable signal is maintained at a high level when data are available), and a clock signal, but the invention is not limited thereto. In one embodiment, for example, the control signal may include a plurality of driving signals, which are used to drive the gate driver circuit and the data driver circuit DDC.

The signal control unit SC may be configured to produce a gate control signal for controlling the gate driver circuit, in response to the control signal, and then to provide the gate control signal to the gate driver circuit. In addition, the signal control unit SC may be configured to transfer a data control signal for controlling the data driver circuit DDC and an image signal to the data driver circuit DDC.

The gate driver circuit may produce gate signals, based on the gate control signal. The gate driver circuit may output the gate signals to the gate lines GL1-GLn. The gate signals may be output in a sequential manner corresponding to the horizontal periods. In some embodiments, a plurality of the gate driver circuits may be arranged in the second direction DR2. The gate driver circuit may be connected to one of first and second side surfaces S1 and S2 of the first display substrate ST1.

In certain embodiments, the gate driver circuit may be disposed at both sides (e.g., the first and second side surfaces S1 and S2) or opposing sides (e.g., the first and third side surfaces S1 and S3) of the first display substrate ST1. In one embodiment, for example, the gate signals may be produced by two gate driver circuits, which are disposed at the first and second side surfaces S1 and S2 of the first display substrate ST1, and then may be output to the gate lines GL1-GLn, respectively.

A plurality of the data driver circuits DDC may be arranged in the first direction DR1 and may be connected to the first display substrate ST1 of the display panel DP. The data driver circuit DDC may produce image voltages, which correspond to image signals provided from the signal control unit SC, based on the data control signal transmitted from the signal control unit SC. The data driver circuit DDC may output image voltages to the plurality of data lines DL1-DLm.

The data driver circuit DDC may include a flexible printed circuit board DCB and a data driver chip DIC mounted thereon. The flexible printed circuit board DCB may be configured to electrically connect the main circuit board PB to the first display substrate ST1. A plurality of data driver chips DIC may be used to apply data signals to corresponding ones of the data lines DL1-DLm, respectively.

According to some embodiments of the invention, the data driver circuit DDC may be in the form of a TCP, but the invention is not limited thereto. The data driver chip DIC may be directly mounted, in a chip-on-glass manner, on a fourth display substrate ST4. In such an embodiment, the data driver chip DIC may be mounted on the peripheral area PA of the first display substrate ST1.

The main circuit board PB may be connected to the flexible printed circuit boards DCB and may be disposed on a bottom surface of the display panel DP. Here, the bottom surface of the display panel DP may be a surface that is opposite to a top surface of the display panel DP through which an image is displayed. In an embodiment, the main circuit board PB may be in the form of a printed circuit board and may be configured to have a flexible property.

Figure 4:
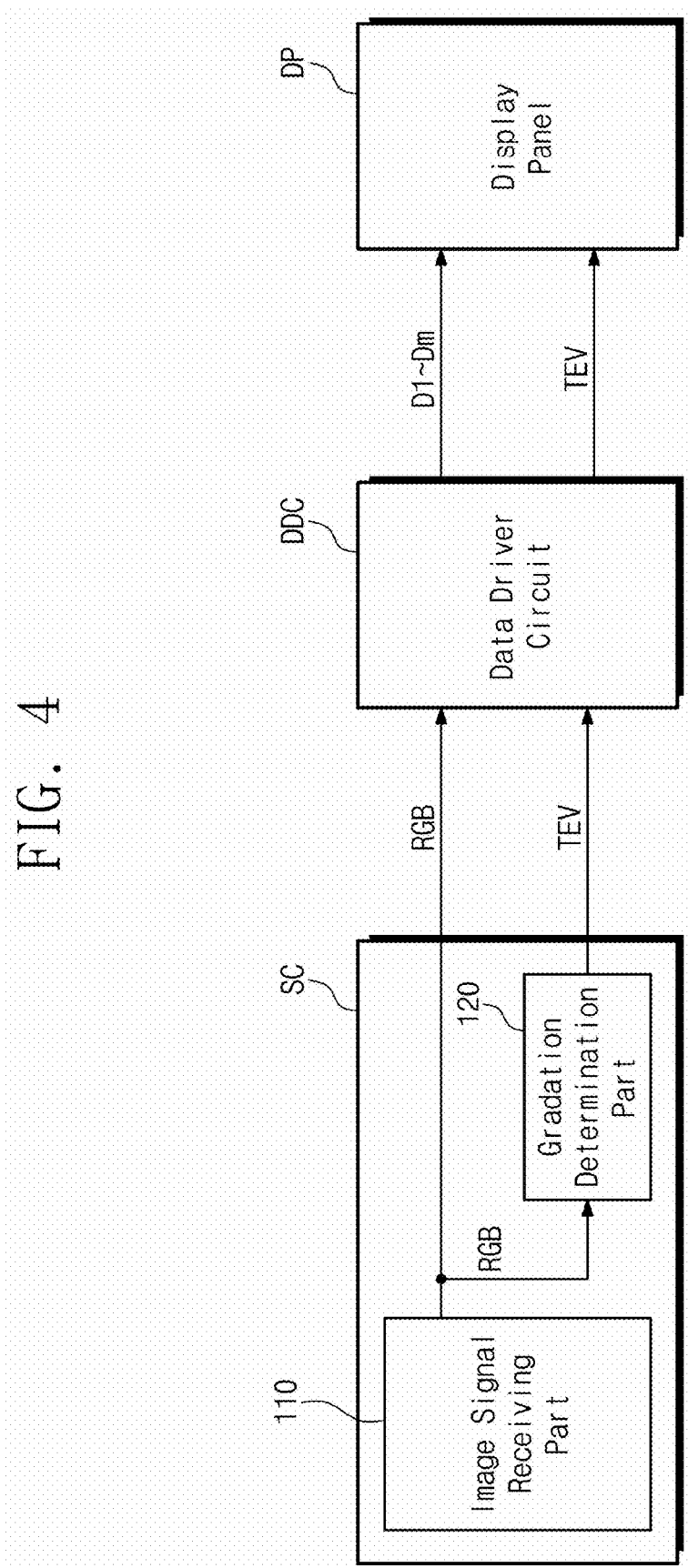
FIG. 4 is a block diagram of a display device shown in FIG. 3A.
Figure 5B:
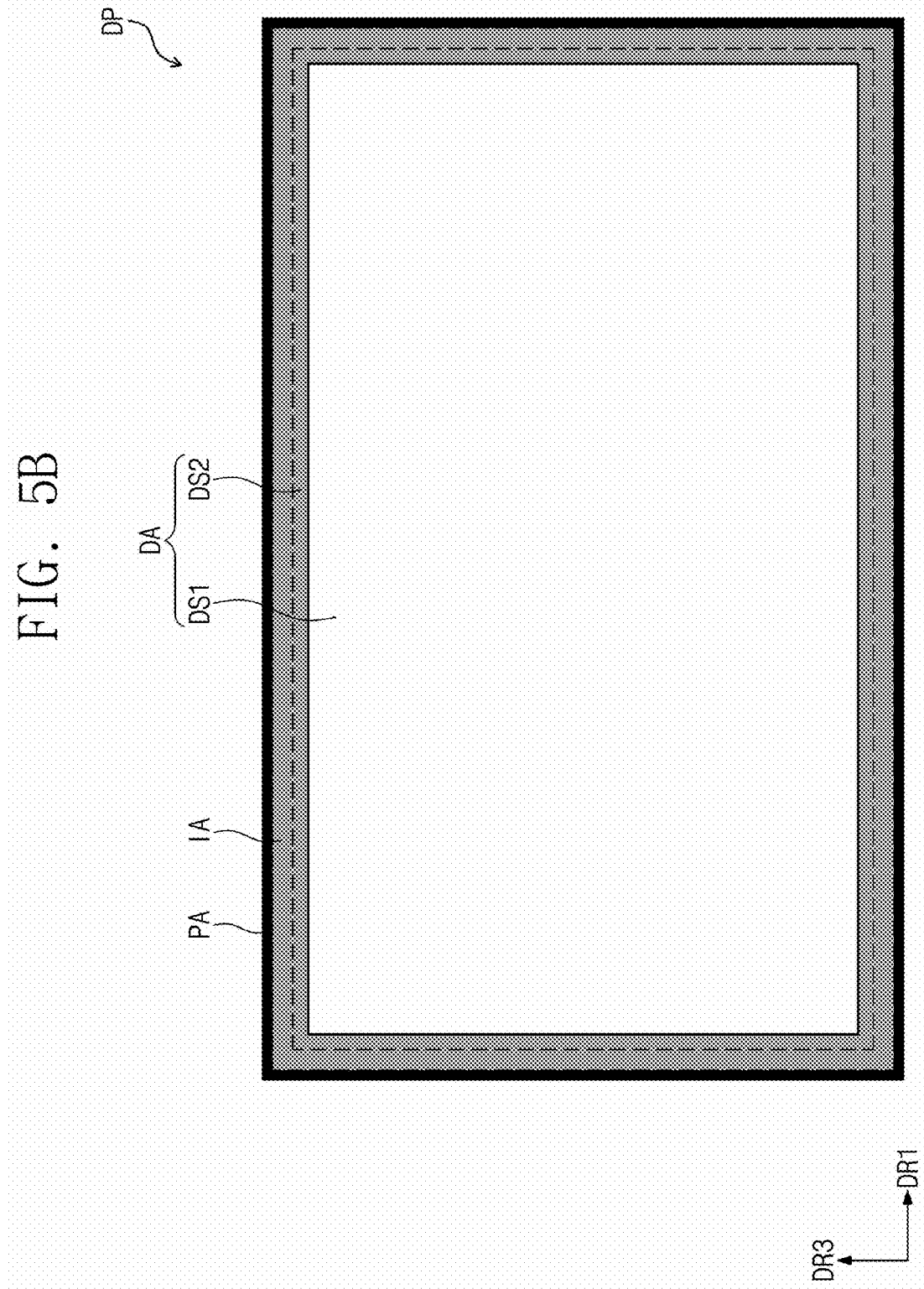
FIG. 5B is a plan view illustrating a display panel on which another image is displayed according to some embodiments of the invention.

FIG. 4 is a block diagram of a display device shown in FIG. 3A. FIG. 5A is a plan view illustrating a display panel on which an image is displayed according to some embodiments of the invention. FIG. 5B is a plan view illustrating a display panel on which another image is displayed according to some embodiments of the invention.

Referring to FIGS. 3A and 4, the signal control unit SC may include an image signal receiving part 110, which is configured to receive image data transmitted every frame from the outside, and a gradation determination part 120. The image signal receiving part 110 may be configured to output image signals RGB corresponding to image data. In one embodiment, for example, the image signal receiving part 110 may output the image signals RGB to the data driver circuit DDC and the gradation determination part 120.

The data driver circuit DDC may produce a plurality of image voltages D1-Dm, based on the image signals RGB transmitted thereto. The image voltages D1-Dm, which are produced by the data driver circuit DDC, may be output to the display panel DP from the data driver circuit DDC. The image voltages D1-Dm may be respectively applied to the pixels $PX_{11}$-$PX_{nm}$ of the display panel DP. One of the image voltages D1-Dm may be applied to a pixel electrode of a corresponding pixel of the pixels $PX_{11}$-$PX_{nm}$.

In some embodiments, the gradation determination part 120 may be configured to produce an intermediate voltage TEV, based on the image signals RGB. The intermediate voltage TEV produced by the gradation determination part 120 may be applied to a dummy electrode, which is disposed on the intermediate area IA of the display panel DP, through the flexible printed circuit board DCB. In such an embodiment, a dummy line TL may be disposed on the first display substrate ST1 to connect the dummy electrode to the flexible printed circuit board DCB. In one embodiment, for example, the intermediate voltage TEV may be applied to the dummy electrode from the flexible printed circuit board DCB through the dummy line TL.

In an embodiment, each of the image signals RGB may have one of a plurality of gradation levels. In one embodiment, for example, each of the image signals RGB may have one of 256 gradation levels.

In one embodiment, for example, the intermediate voltage TEV to be provided during one frame may be produced to have a voltage corresponding to an average of gradation levels of the image signals RGB to be provided during the one frame. In such an embodiment, the voltage of the intermediate voltage TEV may be determined every frame based on the image signals RGB of each frame. In such an embodiment, the intermediate voltage TEV may correspond to the average of the image voltages D1-Dm to be applied to the pixels $PX_{11}$-$PX_{nm}$ during each frame. Thus, an image to be displayed through the intermediate area IA of the display panel DP may have a gradation level that corresponds to an average of gradation levels of the image signals RGB to be provided during each frame.

As shown in FIG. 5A, the display area DA of the display panel DP may include a first display surface DS1, on which an image with a first gradation is displayed, and a second display surface DS2, on which an image with a second gradation is displayed. Here, the first gradation may be a gradation level close to a white gradation, and the second gradation may be a gradation level close to a black gradation. In this case, an image to be displayed through the intermediate area IA of the display panel DP may have a gradation level that is substantially equal to an average of the first and second gradations. In some embodiments, the first and second gradations may be 255 and 0 gradations, and in this case, an image to be displayed through the intermediate area IA of the display panel DP may have a 128 gradation.

In some embodiments, the intermediate voltage TEV may be substantially equal to an average of image voltages to be applied to some of the pixels $PX_{11}$-$PX_{nm}$, where the average of image voltages is obtained from predetermined pixels which overlap with the outermost region of the display area DA and are mostly adjacent to the intermediate area IA. Accordingly, an image to be displayed through the intermediate area IA of the display panel DP may have a gradation level corresponding to an average of gradation levels of images that are output from pixels adjacent to an edge region of the display area DA.

As shown in FIG. 5B, the display area DA of the display panel DP may include the first display surface DS1, on which an image with a first gradation is displayed, and a second display surface DS2, on which an image with a second gradation is displayed. Here, the first gradation may be a gradation level close to a white gradation, and the second gradation may be a gradation level close to a black gradation. The first display surface DS1 may overlap with a plurality of first pixels, which are selected from the pixels $PX_{11}$-$PX_{nm}$, and the second display surface DS2 may overlap with a plurality of second pixels, which are selected from the pixels $PX_{11}$-$PX_{nm}$. In this case, the second pixels may be pixels that overlap with the outermost region of the display area DA. Herein, the term "overlap" may mean "overlap in a thickness direction of the display panel DP". Accordingly, an image to be displayed through the intermediate area IA of the display panel DP may have a gradation level that is substantially equal to the second gradation.

As described above, in an embodiment, the image of the second gradation is displayed through the second display surface DS2, but the second display surface DS2 may be used to display images with various gradation levels. In an embodiment, the intermediate area IA of the display panel DP may be configured to display an image whose gradation level is substantially equal to an average of gradation levels of images to be displayed through the second display surface DS2.

In an embodiment, the peripheral area PA of the display panel DP may display a black image due to the black matrix, as shown in FIGS. 5A and 5B.

Figure 6A:
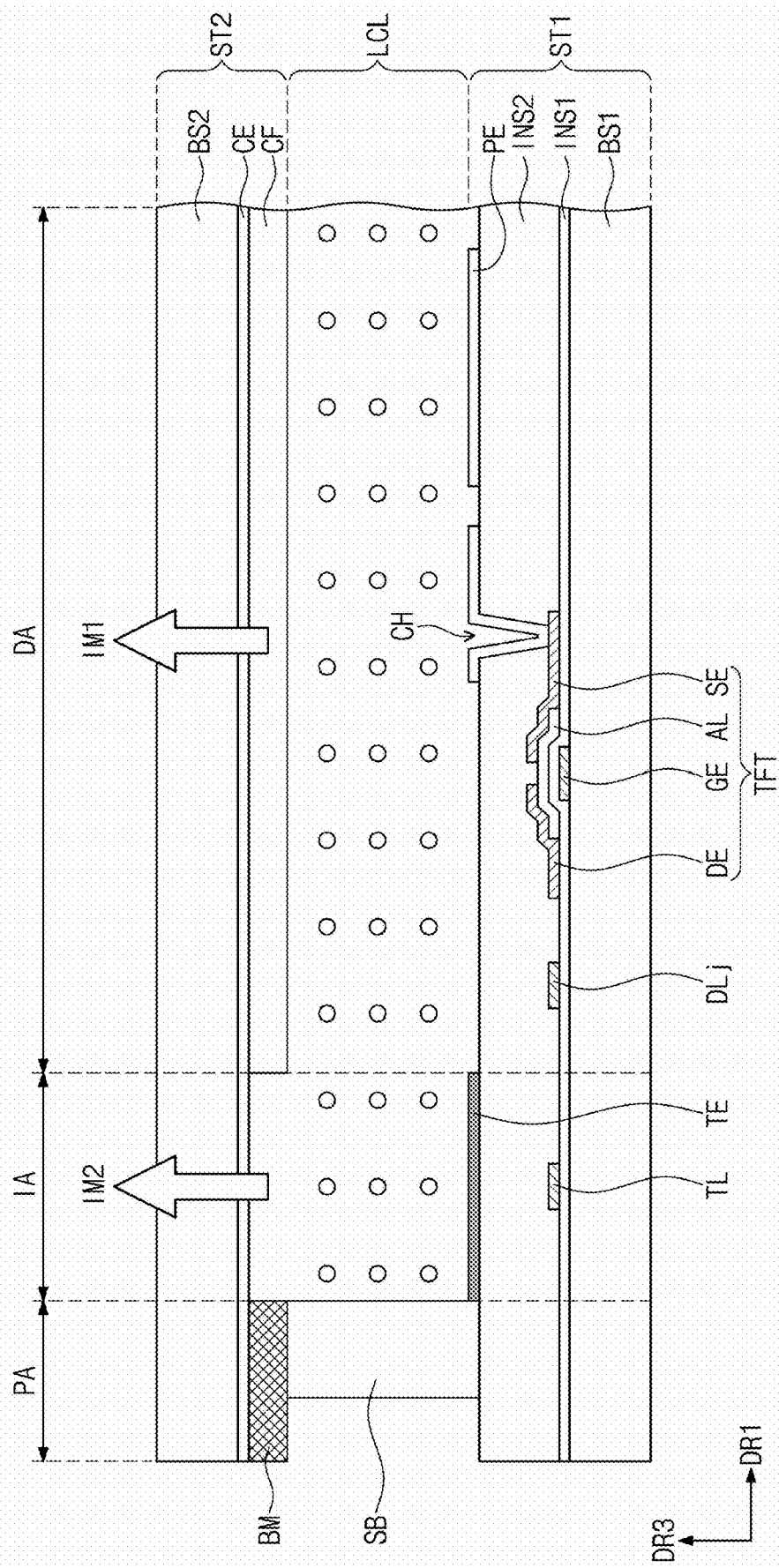
FIG. 6A is a sectional view which is taken along line I-I' of FIG. 3A to illustrate a display panel according to some embodiments of the invention.
Figure 6B:
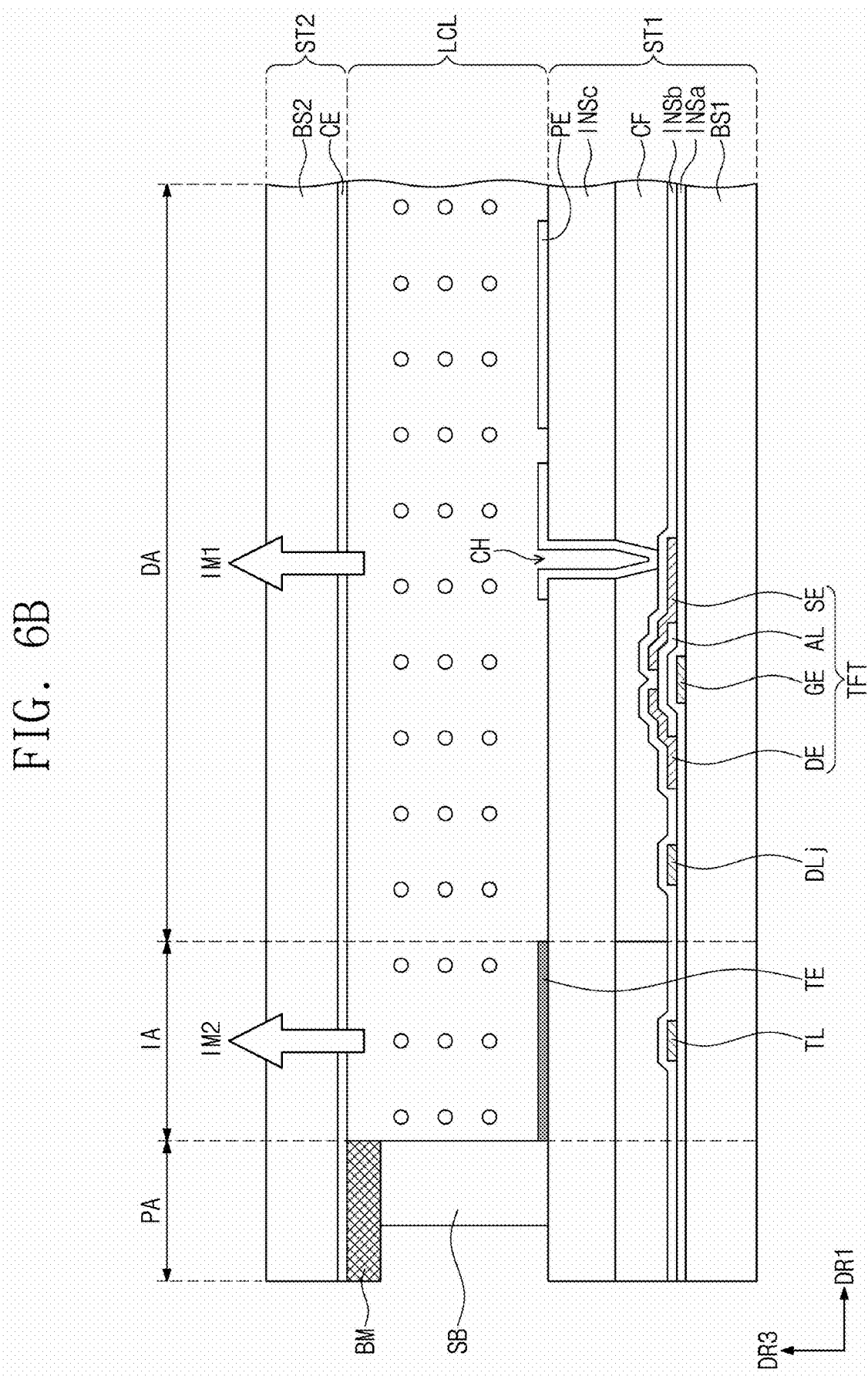
FIG. 6B is a sectional view illustrating a display panel according to some alternative embodiments of the invention.
Figure 7A:
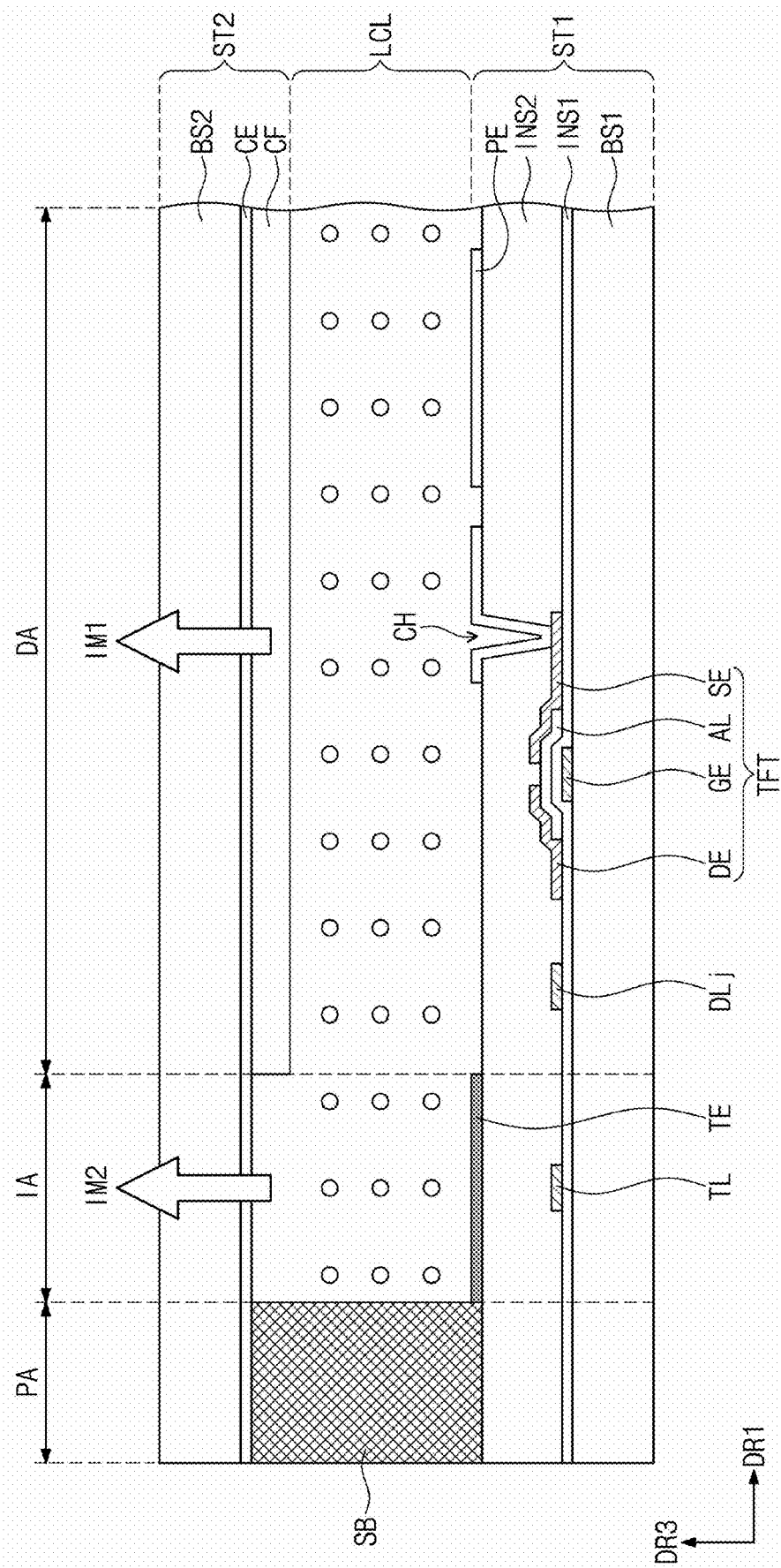
FIG. 7A is a sectional view illustrating a display panel according to some embodiments of the invention.
Figure 7B:
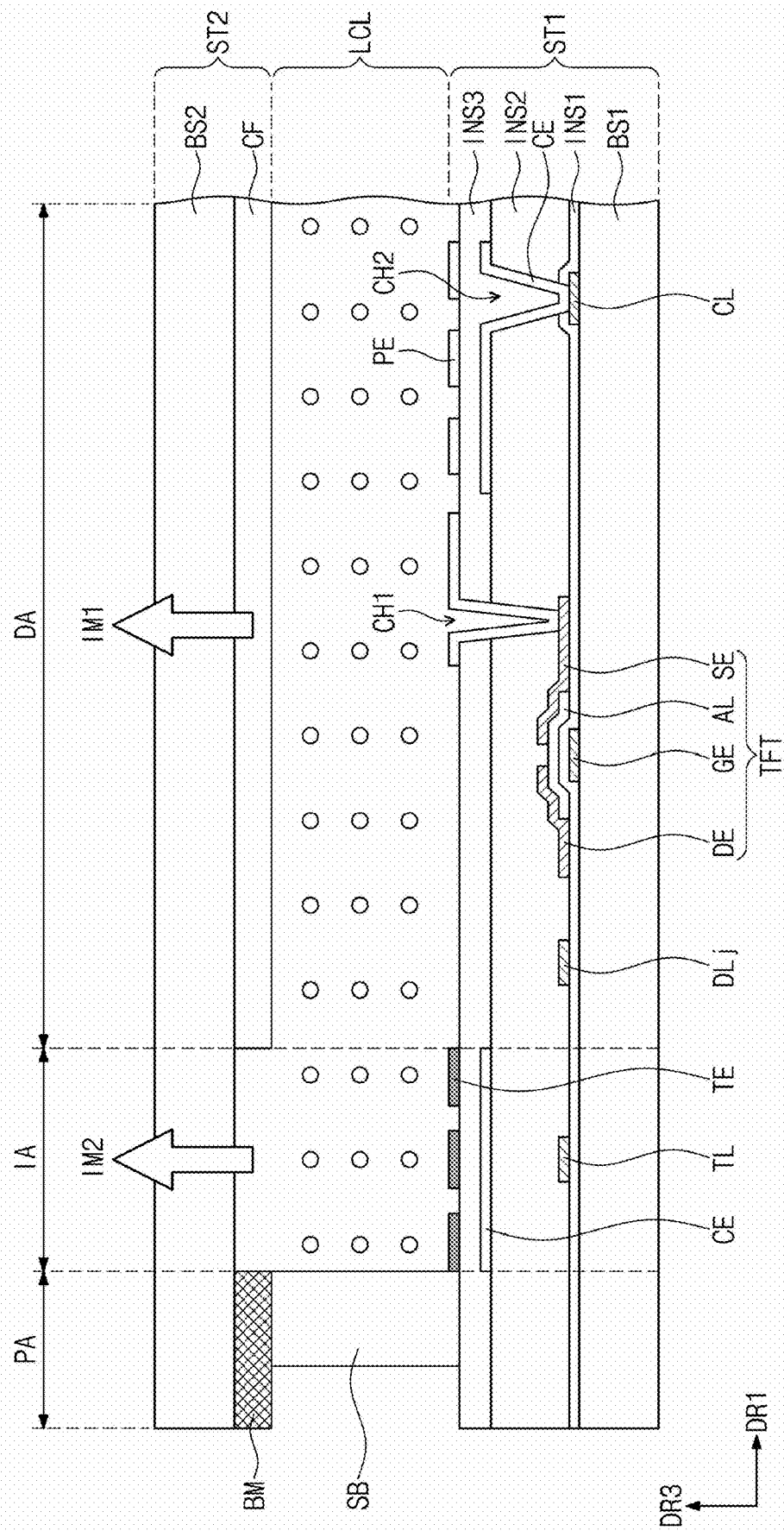
FIG. 7B is a sectional view illustrating a display panel according to some alternative embodiments of the invention.

FIG. 6A is a sectional view which is taken along line I-I' of FIG. 3A to illustrate a display panel according to some embodiments of the invention. FIG. 6B is a sectional view illustrating a display panel according to some alternative embodiments of the invention. FIG. 7A is a sectional view illustrating a display panel according to some embodiments of the invention. FIG. 7B is a sectional view illustrating a display panel according to some alternative embodiments of the invention.

Referring to FIG. 6A, the display panel DP may include the first display substrate ST1, the second display substrate ST2, a liquid crystal layer LCL disposed between the first and second display substrates ST1 and ST2, and a sealing element.

The first display substrate ST1 may include a first base substrate BS1, a thin-film transistor TFT, and a pixel electrode PE, which defines a part of the display unit DC (e.g., see FIG. 3B). A gate electrode GE of the thin-film transistor TFT may be disposed on the first base substrate BS1. The first base substrate BS1 may be a transparent or opaque insulating substrate. In one embodiment, for example, the first base substrate BS1 may be a silicon substrate, a glass substrate, or a plastic substrate.

A first insulating layer INS1 may be disposed on the first base substrate BS1 to cover the gate electrode GE. The first insulating layer INS1 may define or used as a gate insulating layer. The first insulating layer INS1 may be an inorganic insulating layer containing an inorganic material.

A semiconductor layer AL of the thin-film transistor TFT may be disposed on the first insulating layer INS1 covering the gate electrode GE. Although not shown, the semiconductor layer AL may include an active layer and an ohmic contact layer.

A drain electrode DE and a source electrode SE of the thin-film transistor TFT may be disposed on the semiconductor layer AL and the first insulating layer INS1 to be spaced apart from each other. A portion of the semiconductor layer AL between the drain and source electrodes DE and SE may be used as a channel region of the thin-film transistor TFT. In such an embodiment, the data lines DL1-DLm and the dummy line TL may be disposed on the first insulating layer INS1. The dummy line TL may be electrically connected to a dummy electrode TE.

A second insulating layer INS2 may be disposed on the first insulating layer INS1 to cover the thin-film transistor TFT, the data lines DL1-DLm, and the dummy line TL. The second insulating layer INS2 may be used as a passivation layer. In some embodiments, the second insulating layer INS2 may be an organic insulating layer that is formed of or includes an organic material. The second insulating layer INS2 may be disposed to cover an exposed portion of a top surface of the semiconductor layer AL.

A contact hole CH may be defined through the second insulating layer INS2 to expose a portion of the source electrode SE. The pixel electrode PE may be disposed on the second insulating layer INS2 and in the display area DA. A connection electrode (not shown), which diverges from the pixel electrode PE, may be electrically connected to the source electrode SE of the thin-film transistor TFT via the contact hole CH.

In some embodiments, the dummy electrode TE may be disposed on the second insulating layer INS2 to overlap with the intermediate area IA. The dummy electrode TE may be electrically connected to the dummy line TL through a contact hole (not shown), which is defined through the second insulating layer INS2.

According to some embodiments of the invention, the dummy electrode TE may be disposed on the second insulating layer INS2, but the invention is not limited thereto. In one embodiment, for example, the dummy electrode TE, which is electrically coupled to the dummy line TL, may be disposed on the first insulating layer INS1. In this case, the contact hole may not be defined in the second insulating layer INS2.

In certain embodiments, although not shown, a third insulating layer may be disposed on the second insulating layer INS2 to cover the pixel electrode PE and the dummy electrode TE.

In some embodiments, the liquid crystal layer LCL may include a plurality of liquid crystal molecules. The liquid crystal molecules in the liquid crystal layer LCL may be disposed to overlap with the display area DA and the intermediate area IA.

The second display substrate ST2 may include a second base substrate BS2, a color filter CF, and a common electrode CE, which defines a part of the display unit DC, and a black matrix BM.

In some embodiments, the common electrode CE may be disposed on the second base substrate BS2 to overlap with at least the intermediate area IA and the display area DA. The common electrode CE may overlap with the intermediate area IA and the display area DA, as previously described with reference to FIG. 6A, but the invention is not limited thereto. In one embodiment, for example, the common electrode CE may be disposed on the second base substrate BS2 to overlap with the display area DA, and a second dummy electrode may be disposed on the second base substrate BS2 to overlap with the intermediate area IA. In such an embodiment, the second dummy electrode and the first dummy electrode TE may generate an electric field therebetween.

In some embodiments, the color filter CF may be disposed on the common electrode CE to overlap with the display area DA. In such an embodiment, although not shown, an insulating layer may be further disposed between the common electrode CE and the color filter CF.

In such an embodiment, liquid crystal molecules overlapping with the intermediate area IA may be controlled by an electric field generated between the dummy electrode TE and the common electrode CE. The liquid crystal molecules overlapping with the display area DA may be controlled by an electric field produced between the pixel electrode PE and the common electrode CE.

A first image IM1 to be displayed through the display area DA may be displayed to the outside through the color filter CF. By contrast, a second image IM2 to be displayed through the intermediate area IA may be directly displayed to the outside without any interference by the color filter CF.

In addition, the black matrix BM may be disposed on the second base substrate BS2 to expose the display and intermediate areas DA and IA and to cover the peripheral area PA. The black matrix BM may prevent light from being emitted through the peripheral area PA.

A sealing element SB may be disposed on the peripheral area PA to seal a space between the first and second display substrates ST1 and ST2. In some embodiments, when viewed in a plan view, the sealing element SB may be disposed in such a way that its inner sidewall is aligned to an inner sidewall of the black matrix BM. In one embodiment, for example, the inner sidewalls of the sealing element SB and the black matrix BM may be aligned to each other in the third direction DR3 and may define a border between the peripheral area PA and the intermediate area IA.

A display panel of FIG. 6B may be configured to be the same as the display panel DP of FIG. 6A except for a difference in structure of the color filter CF. The same or like elements shown in FIG. 6B have been labeled with the same reference characters as used above to describe the embodiments of the display panel DP shown in FIG. 6A, and any repetitive detailed description thereof will hereinafter be omitted or simplified.

Referring to FIG. 6B, in an alternative embodiment, a first insulating layer INSa may be disposed on the first base substrate BS1 to cover the gate electrode GE. A second insulating layer INSb may be disposed on the first insulating layer INSa to cover the drain electrode DE, the source electrode SE, the semiconductor layer AL, and a data line, e.g., the j-th data line DLj.

The color filter CF may be disposed on the second insulating layer INSb and may overlap with the display area DA. A third insulating layer INSc may be disposed on the second insulating layer INSb to cover the color filter CF. The pixel electrode PE and the dummy electrode TE may be disposed on the third insulating layer INSc.

A display panel of FIG. 7A may be configured to be the same as the display panel DP of FIG. 6A except for some differences associated with the sealing element SB and the black matrix BM. The same or like elements shown in FIG. 7A have been labeled with the same reference characters as used above to describe the embodiments of the display panel DP shown in FIG. 6A, and any repetitive detailed description thereof will hereinafter be omitted or simplified.

Referring to FIG. 7A, in another alternative embodiment, the sealing element SB may be disposed between the first and second display substrates ST1 and ST2 to overlap with the peripheral area PA. In some embodiments, the sealing element SB may fully overlap with the peripheral area PA.

In an embodiment, the sealing element SB may be formed of or include a material having a black color. In such an embodiment, the black matrix BM may be omitted. In such an embodiment, the sealing element SB may function as the black matrix BM.

A display panel of FIG. 7B may be configured to be the same as the display panel DP of FIG. 6A except for some differences associated with the common electrode CE. The same or like elements shown in FIG. 7B have been labeled with the same reference characters as used above to describe the embodiments of the display panel DP shown in FIG. 7A, and any repetitive detailed description thereof will hereinafter be omitted or simplified.

Referring to FIG. 7B, in another alternative embodiment, a gate electrode GE and a control line CL may be disposed on the first base substrate BS1. The first insulating layer INS1 may be disposed on the first base substrate BS1 to cover the gate electrode GE and the control line CL.

The second insulating layer INS2 may be disposed on the first insulating layer INS1 to cover the drain electrode DE, the source electrode SE, the semiconductor layer AL, and the data line DLj. The common electrode CE may be disposed on the second insulating layer INS2. The common electrode CE may include a first common electrode, which overlaps with the display area DA, and a second dummy electrode, which overlaps with the intermediate area IA. The first common electrode may be electrically connected to the control line CL through a second contact hole CH2 formed in the second insulating layer INS2. In some embodiments, the control line CL may be applied with a ground voltage.

In an embodiment, the first common electrode and the second dummy electrode may be electrically connected to or disconnected from each other. In an embodiment where the first common electrode is disconnected from the second dummy electrode, a dummy line for applying a common voltage to the second dummy electrode may be disposed on the first base substrate BS1.

A third insulating layer INS3 may be disposed on the second insulating layer INS2 to cover the common electrode CE. The first dummy electrode TE and the pixel electrode PE may be disposed on the third insulating layer INS3. In some embodiments, the pixel electrode PE may partially overlap with the first common electrode. In such an embodiment, the pixel electrode PE may be disposed to partially expose the first common electrode.

An embodiment of a method of providing the common electrode CE on the first base substrate BS1 has exemplarily been described with reference to FIG. 7B. In such an embodiment, as shown in FIG. 7B, the common electrode CE and the pixel electrode PE may be disposed on the first base substrate BS1 but at different levels, but the invention is not limited thereto. In one alternative embodiment, for example, the common electrode CE and the pixel electrode PE may be disposed on the first base substrate BS1 and at the same level.

Figure 8:
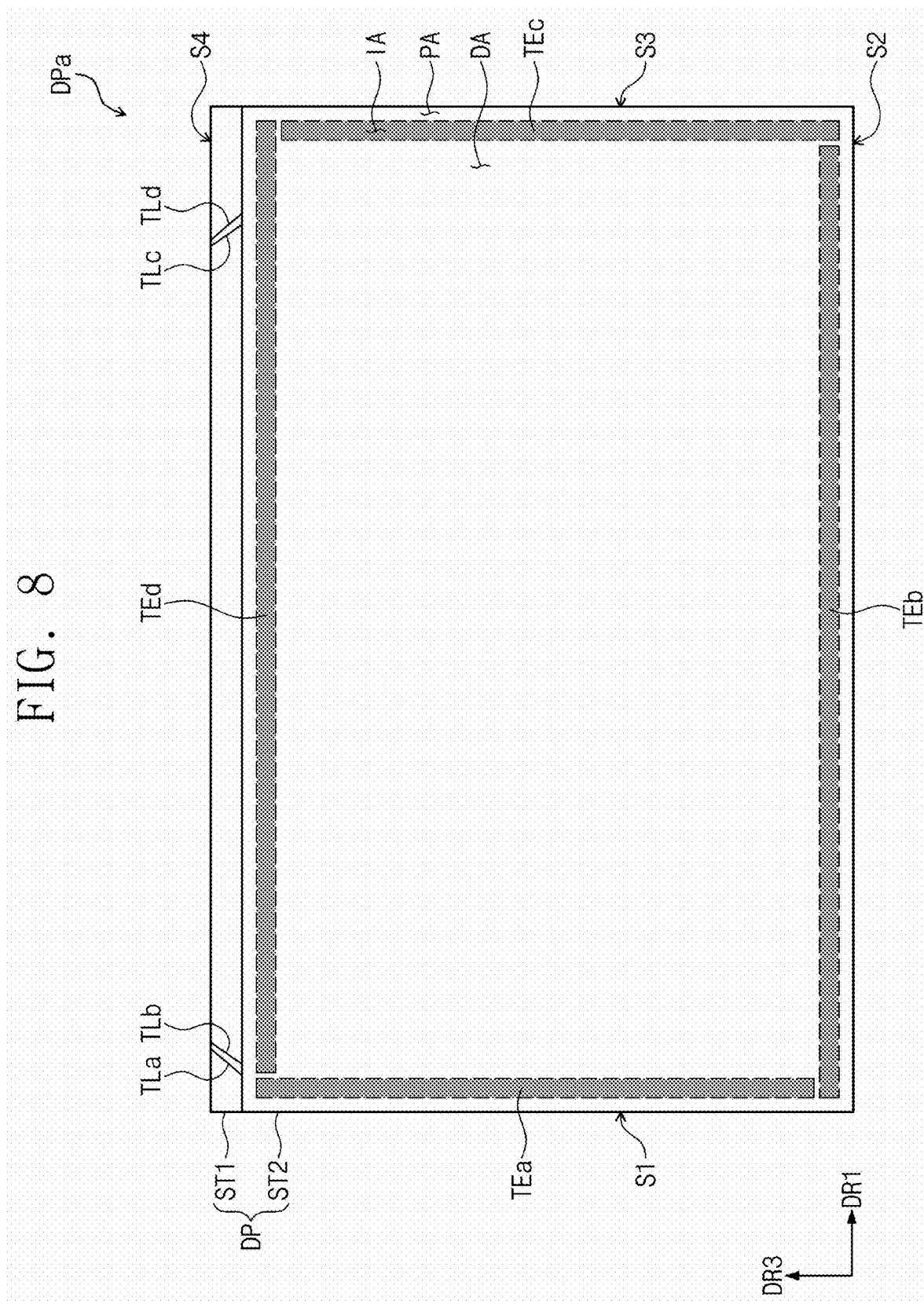
FIG. 8 is a plan view illustrating a display device according to some embodiments of the invention.
Figure 9:
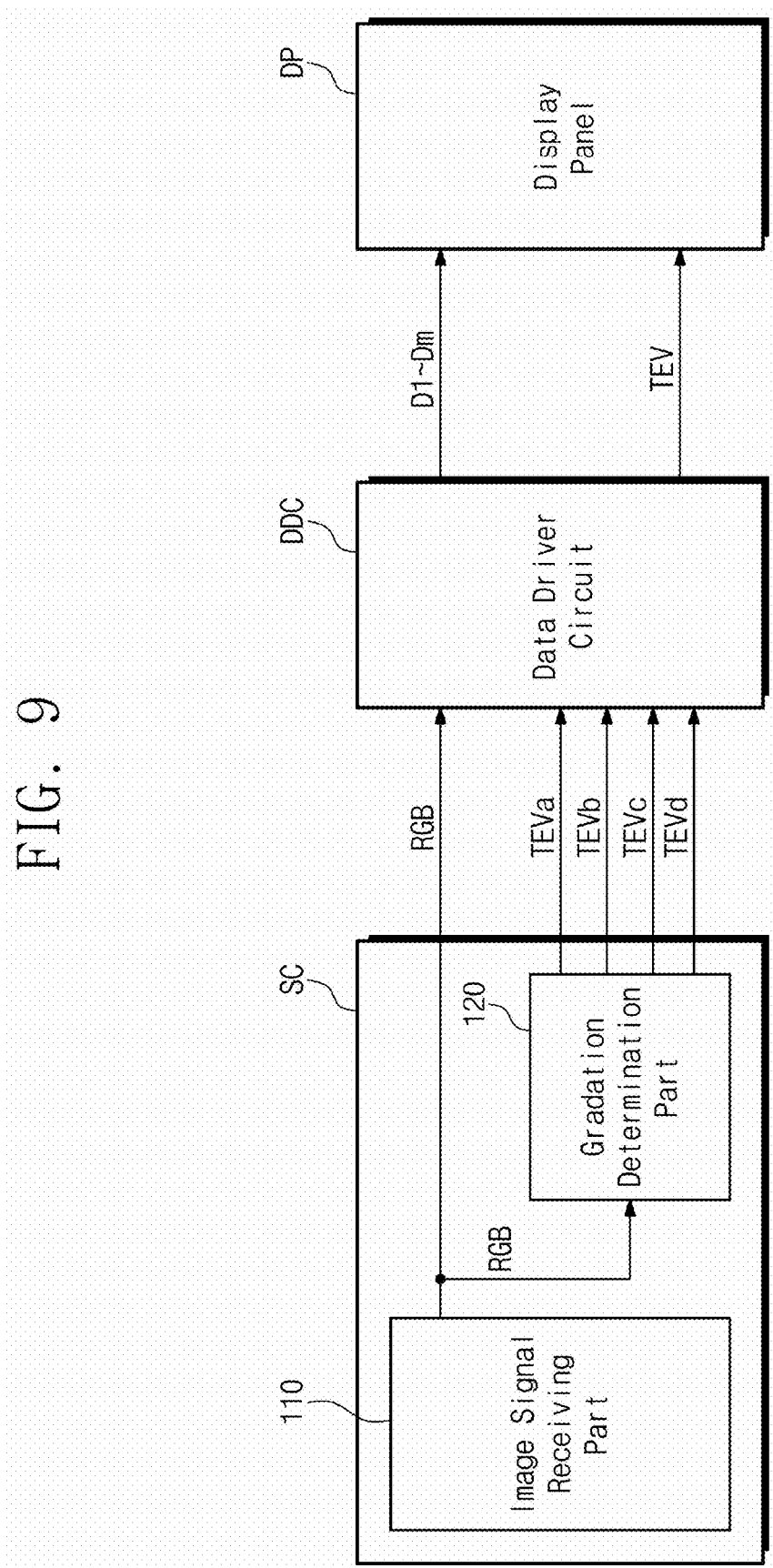
FIG. 9 is a block diagram of the display device shown in FIG. 8.

FIG. 8 is a plan view illustrating a display device according to some embodiments of the invention. FIG. 9 is a block diagram of the display device shown in FIG. 8.

A display panel DPa shown in FIGS. 8 and 9 may be substantially the same as the display panel DP of FIGS. 3A and 4, except that a plurality of dummy electrodes TEa-TEd, not one dummy electrode, may overlap with the intermediate area IA. In one embodiment, for example, the plurality of dummy electrodes TEa-TEd may be disposed on the first base substrate BS1 to overlap with the intermediate area IA.

In one embodiment, for example, a first dummy electrode TEa may be disposed to be adjacent to a first side surface S1 of the first base substrate BS1 and to overlap with the intermediate area IA. A second dummy electrode TEb may be disposed to be adjacent to a second side surface S2 of the first base substrate BS1 and to overlap with the intermediate area IA. A third dummy electrode TEc may be disposed to be adjacent to a third side surface S3 of the first base substrate BS1 and to overlap with the intermediate area IA. A fourth dummy electrode TEd may be disposed to be adjacent to a fourth side surface S4 of the first base substrate BS1 and to overlap with the intermediate area IA.

In such an embodiment, first to fourth dummy lines TLa-TLd, which transmit first to fourth intermediate voltages TEVa-TEVd to the first to fourth dummy electrodes TEa-TEd, respectively, may be disposed on the first base substrate BS1.

The gradation determination part 120 may be configured to produce the first to fourth intermediate voltages TEVa-TEVd, based on the image signals RGB provided from the image signal receiving part 110.

Accordingly, in such an embodiment of the display panel DP, the first to fourth dummy electrodes TEa-TEd may display first to fourth images, whose gradation levels are different from each other, through the intermediate area IA.

Figure 10:
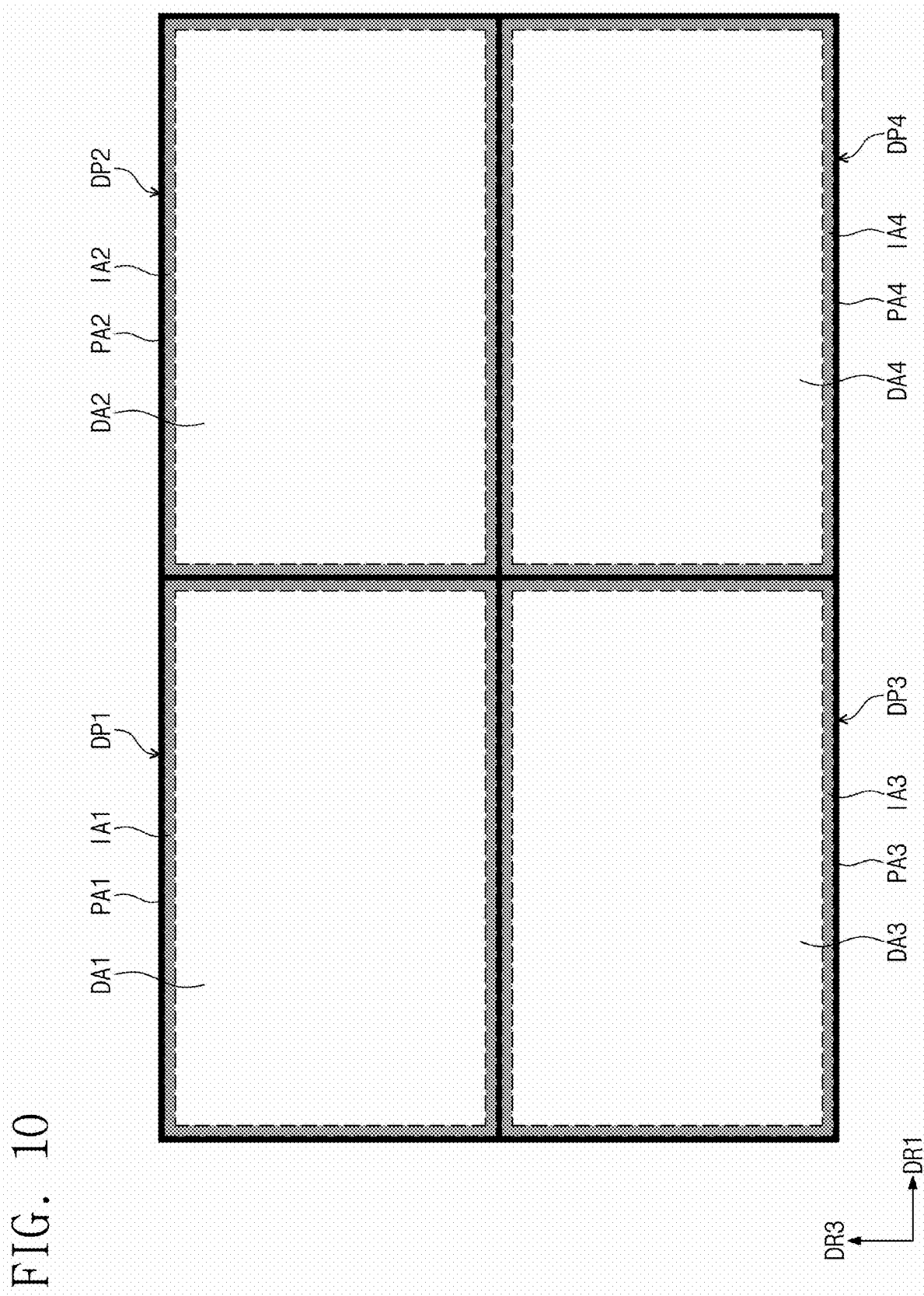
FIG. 10 is a plan view illustrating a display device according to some embodiments of the invention.

FIG. 10 is a plan view illustrating a display device according to some embodiments of the invention. Referring to FIG. 10, an embodiment of a display device includes a plurality of display panels DP1-DP4. Each of the display panels DP1-DP4 may include a display area, an intermediate area, and a peripheral area.

The first to fourth display panels DP1-DP4 may include first to fourth display areas DA1-DA4, first to fourth intermediate area IA1-IA4 and first to fourth peripheral area PA1-PA4, respectively, and in some embodiments, a single image may be displayed through the first to fourth display areas DA1-DA4. In a conventional display device including a plurality of display panels, when a single image is displayed by the plurality of display panels, a user may recognize the single image as several segments, due to a bezel area between the display panels. Here, the bezel area may be a region including the intermediate area and the peripheral area.

According to embodiments of the invention, the first to fourth display panels DP1-DP4 may include first to fourth intermediate areas IA1-IA4, respectively, each of which is configured to display an image whose gradation level is determined based on a gradation level of an image to be displayed on the display area thereof. Accordingly, recognition of borders between the first to fourth display panels DP1-DP4 by a viewer may be effectively prevented or substantially lowered.

According to some embodiments of the invention, a display device may include an intermediate area disposed between a peripheral area and a display area. The intermediate area of the display device may be configured to display an image, whose gradation level is determined based on a gradation of an image displayed on the display area.

Since an image to be displayed through the intermediate area of the display device has a specific gradation level, a bezel area of the display device may be recognized to have an illusively reduced area.

While the invention have been particularly shown and described with reference to some exemplary embodiments thereof, it will be understood by one of ordinary skill in the art that variations in form and detail may be made therein without departing from the spirit and scope of the attached claims.

What is claimed is:
1. A display device, comprising:
 a plurality of display panels that display one image adjacent to each other, each having a display area, an intermediate area adjacent to the display area, a peripheral area spaced apart from the display area with the intermediate area interposed therebetween;
 wherein each of the plurality of display panels comprises,
  a base substrate;
  a pixel circuit disposed on the base substrate and overlapping the display area and the intermediate area;
  a color filter disposed over the pixel circuit;
  a sealing member disposed on the base substrate and overlapping the peripheral area; and
  a black matrix disposed on the sealing member and disposed only in the peripheral area;
 wherein a first width of the black matrix is greater than a second width of the sealing member,
 wherein an inner surface of the sealing member and an inner surface of the black matrix are aligned with each other,
 wherein each of the plurality of display panels comprises at least one dummy electrode disposed on the base substrate and overlapping the intermediate area including portions bordering the display area and the periph- eral area, and not overlapping the black matrix or the color filter within the intermediate area, and wherein the intermediate area is configured to display an image generated based on a gradation level of an image displayed in the display area and the peripheral area.

2. The display device of claim 1, wherein the peripheral area of one display panel of the plurality of display panels is adjacent to the peripheral area of another display panel adjacent to the one display panel of the plurality of display panels, and wherein the sealing member of the one display panel is spaced apart from the sealing member of the another display panel.

3. The display device of claim 1, wherein a space is defined between the sealing member of the one display panel and the sealing member of the another display panel.

4. The display device of claim 1, wherein each of the plurality of display panels comprises, a pixel electrode disposed on the base substrate and overlapping the display area.

5. The display device of claim 4, wherein a corresponding one image voltage among a plurality of image voltages is provided to the pixel electrode through the pixel circuit, wherein an intermediate voltage generated based on the image voltage is provided to the dummy electrode, and wherein the intermediate voltage is an average value of the plurality of image voltages.

6. The display device of claim 1, wherein the color filter overlaps the display area and the intermediate area in a plan view.

7. The display device of claim 1, wherein each of the plurality of display panels further includes a plurality of light emitting unit elements disposed on the base layer.

8. The display device of claim 7, wherein a width of the peripheral area is smaller than a width of the intermediate area.

9. The display device of claim 7, wherein the width of the peripheral area is equal to the second width.

10. The display device of claim 1, wherein the color filter is only in the display area.

11. The display device of claim 1, wherein the sealing member extends to a border between the peripheral area and the intermediate area.

12. A display device, comprising:

a first display panel having a first display area, a first intermediate area adjacent to the first display area, and a first peripheral area spaced apart from the first display area with the first intermediate area interposed therebetween; and a second display panel adjacent to the first display panel and having a second display area, a second intermediate area adjacent to the second display area, and a second peripheral area spaced apart from the second display area with the second intermediate area interposed therebetween are defined, and are adjacent to the first display panel a second display panel;

wherein the first display panel comprises, a first base substrate;

a first pixel circuit disposed on the first base substrate and overlapping the first display area and the first intermediate area;

a first color filter disposed on the first pixel circuit;

a first sealing member disposed on the first base substrate and overlapping the first peripheral area; and a first black matrix disposed on the first sealing member and disposed only in the first peripheral area;

wherein the second display panel comprises, a second base substrate;

a second pixel circuit disposed on the second base substrate and overlapping the second display area and the second intermediate area;

a second color filter disposed on the second pixel circuit;

a second sealing member disposed on the second base substrate and overlapping the second peripheral area; and a second black matrix disposed on the second sealing member and disposed only in the second peripheral area;

wherein the first black matrix and the second black matrix are adjacent, wherein the first sealing member and the second sealing member are spaced apart from each other, wherein a space is defined between the first sealing member and the second sealing member, wherein the first display panel and the second display panel display a single image, wherein an inner surface of the first sealing member and an inner surface of the first black matrix are aligned with each other, wherein an inner surface of the second sealing member and an inner surface of the second black matrix are aligned with each other, wherein the first display panel comprises at least one first dummy electrode disposed on the first base substrate and overlapping the first intermediate area including portions bordering the first display area and the first peripheral area, and not overlapping the first black matrix or the first color filter within the first intermediate area, wherein the second display panel comprises at least one second dummy electrode disposed on the second base substrate and overlapping the second intermediate area including portions bordering the second display area and the second peripheral area, and not overlapping the second black matrix or the second color filter within the second intermediate area, wherein the first intermediate area is configured to display an image generated based on a gradation level of an image displayed in the first display area, and wherein the second intermediate area is configured to display an image generated based on a gradation level of an image displayed in the second display area.

13. The display device of claim 12, wherein a width of the first black matrix is greater than a width of the first sealing member, and wherein a width of the second black matrix is greater than a width of the second sealing member.

14. The display device of claim 12, wherein the color filter is only in the first display area.

15. The display device of claim 12, wherein the first sealing member extends to a border between the first peripheral area and the first intermediate area.

* * * * *